United States Patent Office 2,714,554
Patented Aug. 2, 1955

2,714,554
METHOD OF PRODUCING GADOLINIUM

Frank H. Spedding and Adrian H. Daane, Ames, Iowa, assignors to the United States of America as represented by the United States Atomic Energy Commission No Drawing. Application March 27, 1953,
Serial No. 345,255

11 Claims. (Cl. 75—84)

This invention deals with the production of gadolinium metal and with the isolation of gadolinium in metallic form from mixtures of gadolinium chloride with samarium chloride, europium chloride and/or ytterbium chloride.

When rare earths-containing ores are processed, it is usually hard to obtain the gadolinium free of samarium and/or europium; these three elements are in neighboring position in the periodic table of elements and have such similar chemical properties that their separation has been found difficult. In processing gadolinite, for instance, a product is usually obtained which averages a content of about 90% gadolinium oxide and about 10% samarium oxide with or without very small quantities of europium oxide.

It is an object of this invention to provide a process by which the gadolinium may be separated in an efficient and simple manner.

It is another object of this invention to provide a process by which gadolinium may be separated from samarium, ytterbium and/or europium at the same time.

These objects are accomplished by contacting the mixture of gadolinium compound with at least one compound of samarium, europium and ytterbium compounds, such as oxides, with hydrochloric acid, whereby these rare earth compounds are converted to the chlorides, and heating the chlorides with an alkali or alkaline earth metal whereby the gadolinium chloride is reduced to metallic gadolinium while the other rare earth chlorides of the mixture remain unaffected and form a slag phase separate from that of the metallic gadolinium. The metallic gadolinium obtained after the reaction and prior to dissolution of the slag is usually present in the bottom of the reaction vessel and can be separated from the slag layer by dissolving the latter in water.

Sodium, potassium, barium and calcium are suitable reducing agents for the process of the invention; however, calcium is the preferred metal. It is advisable to use the reducing agent in a quantity excessive of that of the amount stoichiometrically required. An excess of at least 5% was found advantageous, but an excess of 10% or more was found preferable. The calcium is suitably ground for the process in order to allow a more homogeneous mixture with the rare earths chloride, and when in this condition it should be stored in an inert atmosphere such as argon until used.

The conversion of the rare earths oxide mixture to the chlorides is suitably carried out by dissolving it with hydrochloric acid of a concentration of about 6 M and evaporating the solution obtained thereby to a boiling point of from 125 to 130° C. On cooling, the hydrated chlorides crystallize; these crystals are then slowly heated in a stream of dry hydrogen chloride to about 400° C. at a pressure of about 60 mm. mercury whereby dehydration takes place.

The optimal temperature for the reducing reaction for the gadolinium chloride was found to be between 1350 and 1450° C.

The equipment in which the process of this invention is carried out may be of varied construction. Very good results were obtained with cylindrical tantalum crucibles. In the experiments described in the examples below, tantalum crucibles were used which were 1 1/16" in diameter and 5" high; they were welded from 0.001"-thick sheets. A perforated tantalum lid allowed entry and escape of gas. The tantalum crucible was inserted into a covered magnesium oxide crucible which was 2" wide and 7" tall and this assembly of tantalum and magnesium oxide crucibles was then placed in a 2 1/4"-wide silica tube, one end of which was fused shut and the other end of which was ground to serve as the inner half of a 55/50 standard taper joint. The silica tube was sealed onto a vacuum system by means of sealing wax, evacuated to $10^{-3}$ mm. mercury, and then filled to 1 atmosphere with argon which had been purified by passing it over hot uranium turnings. Before loading the tantalum crucible, it was outgassed by heating it to about 1400° C. in a vacuum.

The charge consisted of a compacted mixture of the calcium powder and the rare earths chloride mixture. Heating of the crucible was carried out in an induction furnace and the temperature was first raised to about 550 to 600° C.; at this temperature the exothermic reaction started and the temperature increased suddenly. About 5 minutes were required to reach the final temperature of about 1350° C. but not higher than 1450° C. at which the crucible was then held for about 13 minutes to permit complete agglomeration of the gadolinium metal at the bottom of the crucible. Thereafter the crucible was allowed to cool to room temperature and the tantalum vessel was soaked in water whereby the calcium chloride slag and the excess calcium dissolved, leaving the layer of fused gadolinium in the bottom.

In all instances the gadolinium prepared by the process just described was free from any of the rare earths present. However, in a few rare instances it contained small quantities of the reducing metal, such as calcium. In this case the gadolinium could be furthermore decontaminated by remelting the metal in the same crucible and vacuum apparatus in a vacuum of $10^{-3}$ mm. of mercury or less at about 1350° C.

In the following, two examples are given for illustrative purposes without the intention to have the invention limited to the details given therein.

Example I

A mixture of gadolinium oxide, samarium oxide and europium oxide was converted with hydrochloric acid to the chlorides. The mixture contained about 90% of gadolinium chloride, about 10% samarium chloride and 0.1% europium chloride. 40 grams of this chloride mixture and 10.5 grams of calcium were placed in a tantalum crucible. The crucible was evacuated and filled with argon gas, and heating to 1500° C. was carried out while maintaining an argon atmosphere. The reaction mass was then cooled, and the slag was leached out with water. 21.5 grams of gadolinium were obtained. No samarium could be detected in the gadolinium which indicates a content of not higher than 0.06%, the limit of detection.

Example II 42 grams of gadolinium chloride consisting of 98% of $GdCl_3$, about 2% of $SmCl_3$ and 0.02% of $EuCl_3$ were mixed with calcium, using an excess of about 10% of the amount stoichiometrically required. The mixture was packed into the tantalum crucible described above. The reaction mass was heated to about 1375° C. for 15 minutes as previously described. Upon cooling and leaching with water, 23.8 grams of gadolinium were obtained which represents a yield of about 96% based on the total amount of rare earth chlorides used. The metal as well as the slag were analyzed and it was found that the gadolinium contained less than 0.06% of samarium, the lower limit of detection. Since the samarium-europium ratio in the slag was the same as in the original material, it was apparent that neither the europium chloride nor the samarium chloride were reduced by the calcium to the metallic state in this experiment.

In another instance it was also attempted to reduce ytterbium chloride with calcium under the same conditions. However, it was found that the only reduction taking place was that to ytterbous chloride. This shows that the process of the invention can also successfully be used to separate the gadolinium from ytterbium associated therewith in a mixture of their chlorides.

It will be understood that this invention is not to be limited to the details given herein but that it may be modified within the scope of the appended claims.

What is claimed is:

1. A process of recovering pure metallic gadolinium from a mixture containing gadolinium oxide and at least one of the oxides of the rare earths of the group consisting of samarium, europium and ytterbium, comprising treating the mixture with hydrogen chloride whereby the chlorides of gadolinium and of the rare earths are formed; mixing said chlorides with a reducing agent selected from the group consisting of alkali metal and alkaline earth metal; bringing the mixture to a temperature between 1350 and 1450° C. whereby the gadolinium chloride is selectively reduced to metallic gadolinium while the other rare earth chlorides remain as chlorides; and removing said other rare earth chlorides by dissolving in water.

2. The process of claim 1 wherein the reducing agent is calcium.

3. The process of claim 2 wherein calcium is added in an excess of at least 5% over the amount stoichiometrically required.

4. The process of claim 3 wherein the excess of calcium is at least 10% of that stoichiometrically required.

5. The process of claim 1 wherein heating is first carried out to between 550 and 600° C. whereby the reaction starts and the temperature automatically and suddenly increases and then holding the temperature at from 1350 to 1450° C. for about 15 minutes.

6. The process of claim 1 wherein the reaction is carried out in an inert atmosphere.

7. The process of claim 6 wherein the atmosphere is argon.

8. The process of claim 1 wherein the reaction mixture, at least while at elevated temperature, contacts tantalum surfaces only.

9. The process of recovering pure metallic gadolinium from a mixture of gadolinium chloride and samarium chloride comprising mixing the chloride mixture with disintegrated calcium as a reducing agent in about 10% excess over the amount stoichiometrically required; heating the reaction mixture obtained thereby to about from 550 to 600° C. whereby the reaction starts and the temperature suddenly increases; holding the temperature at between 1350 and 1450° C. for about 15 minutes whereby the gadolinium chloride is reduced to metallic gadolinium while the samarium chloride remains unaffected; cooling the reaction mass to about room temperature; and removing the samarium chloride by dissolving in water.

10. The process of claim 9 wherein the reaction is carried out in an argon atmosphere.

11. The process of claim 9 wherein the mixture of chlorides and calcium is a compacted mixture.

References Cited in the file of this patent

UNITED STATES PATENTS 2,205,854    Kroll _____ June 25, 1940

OTHER REFERENCES

Comprehensive Treatise on Inorganic and Theoretical Chemistry by Mellor, vol. 5, page 693. Published 1924 by Longmans, Green and Co., New York.

Zeitschrift für Anorganische und Allgemeine Chemie, vol. 231, published 1937. Entire article by Klemm and Bommer in pages 138–171, inclusive. Pages 141, 142 and 143 relied upon.

Thorpe's Dictionary of Applied Chemistry, by Thorpe et al., 4th edition, vol. 5, pages 410, 411. Published 1941 by Longmans, Green and Co., New York.